United States Patent
Dong et al.

(10) Patent No.: US 12,306,823 B2
(45) Date of Patent: May 20, 2025

(54) DATA STORAGE SYSTEM ENSURING CONSISTENCY OF DATA RECEIVED BY A PRODUCER FROM A COLLECTOR VIA A SHARED MEMORY

(71) Applicant: Dell Products L.P., Round Rock, TX (US)

(72) Inventors: Dazhi Dong, Shanghai (CN); Yuval Harduf, Yahud (IL); Venoy Qiang Ma, Chengdu (CN); Xing Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 18/100,129

(22) Filed: Jan. 23, 2023

(65) Prior Publication Data
US 2024/0248890 A1 Jul. 25, 2024

(51) Int. Cl.
*G06F 16/20* (2019.01)
*G06F 16/215* (2019.01)
*G06F 16/23* (2019.01)

(52) U.S. Cl.
CPC ........ *G06F 16/2365* (2019.01); *G06F 16/215* (2019.01)

(58) Field of Classification Search
CPC ............................ G06F 16/2365; G06F 16/215
See application file for complete search history.

(56) References Cited

U.S. PATENT DOCUMENTS

| | | | | |
|---|---|---|---|---|
| 5,604,863 A * | 2/1997 | Allen | ................... | G06F 11/1658 |
| | | | | 714/33 |
| 5,634,072 A * | 5/1997 | Allen | ................... | G06F 12/0804 |
| | | | | 711/E12.04 |
| 6,807,619 B1 * | 10/2004 | Ezra | ....................... | G06F 12/084 |
| | | | | 711/219 |
| 7,725,760 B2 * | 5/2010 | Rowan | ................ | G06F 11/1435 |
| | | | | 700/32 |
| 7,904,428 B2 * | 3/2011 | Perry | ................... | G06F 11/1469 |
| | | | | 707/677 |
| 8,429,351 B1 * | 4/2013 | Yu | ........................ | G06F 12/0862 |
| | | | | 711/E12.004 |
| 8,601,209 B1 * | 12/2013 | LeCrone | ............. | G06F 11/2094 |
| | | | | 711/111 |
| 8,732,213 B2 | 5/2014 | Sowell et al. | | |

(Continued)

FOREIGN PATENT DOCUMENTS

EP 2471013 B1 * 7/2012

*Primary Examiner* — Daniel A Kuddus
(74) *Attorney, Agent, or Firm* — BainwoodHuang (57) ABSTRACT

Ensuring consistency of data being received by a producer from a collector via a shared memory includes maintaining a time-of-day (TOD) variable, and, by the producer for new data, (1) first setting the TOD variable to an invalid value, (2) next writing the new data into the shared memory with a timestamp, and (3) next setting the TOD variable to a time value corresponding to the timestamp. The method further includes, by the collector for the new data, (1) reading the TOD variable and timestamp and confirming that the TOD variable has a valid time value equal to the timestamp, (2) reading the new data from the shared memory, and (3) confirming validity of the new data by (a) reading the TOD variable again, and (b) confirming that the TOD variable has the same valid time value as in the reading step (1).

21 Claims, 5 Drawing Sheets

(56) References Cited

U.S. PATENT DOCUMENTS

| | | | | |
|---|---|---|---|---|
| 9,207,706 | B2* | 12/2015 | Gerwig | G06F 1/14 |
| 2003/0093705 | A1* | 5/2003 | Kriz | G06F 1/14 |
| | | | | 713/600 |
| 2005/0066118 | A1* | 3/2005 | Perry | G06F 11/1469 |
| | | | | 711/112 |
| 2006/0107016 | A1* | 5/2006 | Murotani | G06F 3/0665 |
| | | | | 711/170 |
| 2008/0059808 | A1* | 3/2008 | Engler | G06F 9/524 |
| | | | | 713/189 |
| 2008/0288723 | A1* | 11/2008 | Murotani | G06F 3/067 |
| | | | | 711/E12.001 |
| 2011/0314237 | A1* | 12/2011 | Longinov | G06F 11/2074 |
| | | | | 711/161 |
| 2012/0197868 | A1* | 8/2012 | Fauser | G06F 16/183 |
| | | | | 707/E17.054 |
| 2013/0122568 | A1* | 5/2013 | Zhu | C12N 15/1058 |
| | | | | 435/320.1 |
| 2013/0166568 | A1* | 6/2013 | Binkert | G06F 16/81 |
| | | | | 707/769 |

* cited by examiner

DATA STORAGE SYSTEM ENSURING CONSISTENCY OF DATA RECEIVED BY A PRODUCER FROM A COLLECTOR VIA A SHARED MEMORY

BACKGROUND

The invention is related to the field of data storage systems.

SUMMARY

A method is disclosed of ensuring consistency of data being received by a producer from a collector via a shared memory at regular intervals. Generally, the method includes maintaining a time-of-day (TOD) variable for storing a time value with a granularity at least as fine as an interval size of the intervals. The method further includes, by the producer for new data to be written into the shared memory for a given interval, (1) first setting the TOD variable to an invalid value, (2) next writing the new data into the shared memory with a timestamp, and (3) next setting the TOD variable to a time value corresponding to the timestamp. The method further includes, by the collector for the new data, (1) reading the TOD variable and timestamp from the shared memory and confirming that the TOD variable has a valid time value and is equal to the timestamp, (2) reading the new data from the shared memory, and (3) confirming validity of the new data by (a) reading the TOD variable again from the shared memory, and (b) confirming that the TOD variable has the same valid time value as in the reading step (1).

In some embodiments, the new data is first data updated at the regular intervals, and the method further includes, for second data updated by the producer at other than regular intervals, by the collector for the second data, (1) reading the second data and the timestamp from the shared memory, and (2) confirming validity of the second data by checking that the TOD variable has a time value not older than the timestamp by more than a predefined maximum value.

The TOD variable may be stored in a data region of the shared memory that also stores the new data being written by the producer and read by the collector, and the shared memory may also contains a metadata region in which the producer stores metadata describing structure of the data region, the metadata being read and used by the collector to tailor a manner of access of the data region by collector for correctly accessing the new data.

Further, the metadata may include an update type and an update interval, the update type indicating that the new data is updated at the regular intervals, the update interval identifying the interval size of the regular intervals, the update type and update interval being used by the collector to control timing of accessing the new data to obtain the new data as it is updated by the producer. The update type and update interval may be included in a general area of the metadata, and the metadata may further include a plurality of field definition areas each storing a respective field definition describing structure and content of a respective field of each of a plurality of records of the new data, each field definition being used by the collector to locate and interpret a respective field in each of the records of the new data. The field definitions may each include at least a field name, field location, and field size for the respective field, the field name identifying contents of the field, the field location identifying a relative location of the field in each of the records, the field size identifying a size of the field. The general area may further store a layout type identifying a high-level structure of the data region, the layout type being selected from an array type and a map type, the array type having the records arranged in a single area with no intra-record indirection, the map type having the records arranged across multiple areas with at least one intra-record indirection from one area to another.

In some embodiments, the new data is contained in one record of a multi-record data collection being received by the producer from the collector via the shared memory, each record including a respective data generation identifier stored in the data region and a respective metadata generation identifier stored in the metadata region, and the producer and collector operate according to a protocol including:

by the producer:
  when initially creating a new record in the data region and when reusing a record of the data region, (i) generating a new data generation identifier and writing it into the record, (ii) initializing other record fields, (iii) initializing corresponding metadata in the metadata region, and (iv) setting a metadata generation identifier to equal the data generation identifier; and
  when removing a record from the data region, changing the data generation identifier to an invalid value, and changing the metadata generation identifier to the invalid value; and
by the collector, for collecting a specific instance of the new data:
  copying the entirety of the data collection from the shared memory to private memory of the collector; and
  scanning and processing the records of the data by, for each record:
    (i) skipping further processing of a record when its metadata generation identifier is invalid and when its metadata generation identifier is not equal to its data generation identifier; and
    (ii) collecting record data for downstream use when the metadata generation identifier is valid and equal to the data generation identifier.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

The disclosed technique is directed to systems such as data storage systems that track and maintain performance and capacity metrics during operation, which can be used by a variety of automated or human entities for different purposes. A given system may track a large number (e.g., hundreds) of metrics, for which there are respective data producers and collectors, and for both software and hardware components in the system. The metrics data may be exposed to customers and/or maintenance personnel such as field support engineers. In one example, a telemetry service collects metrics data for offline analytics to provide potential service recommendations, such as extending disk capacity based on usage or detecting disks to be replaced for better overall system performance. In another example, a storage administrator uses performance metrics data to monitor current system throughput (input/output operations per second (IOPS)) or operations latencies to ensure proper system operation.

In known solutions, metrics data collectors send requests to metrics data producers to request metrics data. Each metrics data producer gathers the metrics data and sends it back to a metrics data collector. The producers work with the collectors together to create data transfer channels by which the producers transfer the metrics data to the collectors, according to an aligned protocol and predefined data format definition.

Depending on different designs for the protocol and the communication channel between the producer and the collector, there can be various problems or limitations with such known solutions:

1. Scalability
    For existing solutions, the producer commonly sends the metrics data via either the intra-network or external network to the collector. Each collector is required to create a dedicated session for each producer. However, in a typical system there is an overall limit on the number of open network sockets that are permitted, so this technique can be limited and may not scale well.
2. Efficiency
    For metric data transferred over the network, the producer's metrics data is first copied from the producer's memory to a socket buffer, and after being received on the collector side, it is copied from the socket buffer to the collector's memory. Hence at least two memory copies of the same metrics data are needed. Although there are known utilities/libraries that can be leveraged to transmit a producer's memory contents to memory of the collector, such a technique still requires that all the producers and collectors are bound to a specific library and must understand all its complexities. Also, network latency could be a concern when the metrics data size is large while the network bandwidth is constrained and potentially insufficient.
3. Maintenance
    There are several ways to organize a format for the metrics data. The data format could be specific for each producer, as different producers generate different metrics. Such an approach can be straightforward and thus may be used in closely coupled systems. However, the collector needs to a priori understand the data format from each producer. Any metrics update or new metrics in producers would introduce changes to the collector. Hence, such an approach may not be extensible beyond relatively small and constrained systems.

As an example, one common format may be shared by all producers and collectors, e.g., by sharing the same data structure across different producers. This binds all the producers and collectors to a given language, which may not be practical for a system developed by a large, diverse organization or across multiple organizations. Alternatively, a format can be serialized and deserialized by different components in different languages, which is an approach used in the so-called "Protobuf" for exchanging data between endpoints. However, the Protobuf is generally used only for small amounts of data of control messages. This approach may not be usable with larger data sets that could be dozens or hundreds of megabytes in size.

Thus, what is needed is an efficient mechanism that can decouple producers and collectors to enable producers to introduce new metrics readily and independently, or update existing metrics, without requiring changes to the collectors for such new or updated metrics.

In general, the disclosed technique involves use of a self-descriptive shared memory structure used for data transfer from metrics data producers to metrics data collectors. The producer populates the shared memory according to a definition that is itself stored in the shared memory along with metrics data values, and the collector loads the definition to enable it to accurately parse the shared memory according to the definition to retrieve the metrics data. Each metrics type has one or more fields for values, which in some cases are counters for dynamic aspects of operations (e.g., counts of operations, data transfer, etc.). For a given metric there are thus two shared memory regions, a metadata region and a data region holding the metrics data to be collected. The metadata region includes common attributes and short descriptors describing the structure of the data region for use by the collectors to tailor their accesses to the data region to correctly access stored metrics data.

Also described is a technique for ensuring data consistency in operation. Metrics data in shared memory is created and updated by a producer. A collector reads the shared memory at regular collection intervals according to an interval size defined in the metadata region. To ensure that the collector reads the correct data, while maintaining a desired decoupling of the collector and the producer, the technique employs a time_of_day (TOD) variable, which is the timestamp in seconds, stored in the shared memory (e.g., at the beginning of the data region). Then for a metrics type that is updated at a fixed interval, the TOD value is first loaded and checked. If the target collection timestamp equals the TOD value, the metrics data is properly updated and valid, and can be collected. Otherwise, the metrics data is stale and invalid, and should not be collected. For a metrics type that is updated dynamically at any time, TOD variable can also be checked. However, the producer might change the metrics data quite frequently, and it may be inefficient to update the timestamp each time the producer updates the metrics data. Hence the collector might load and use the metrics data unless the TOD value is older than the target collection timestamp by more than some desired amount (e.g., more than 10 seconds).

Embodiments

Figure 1:
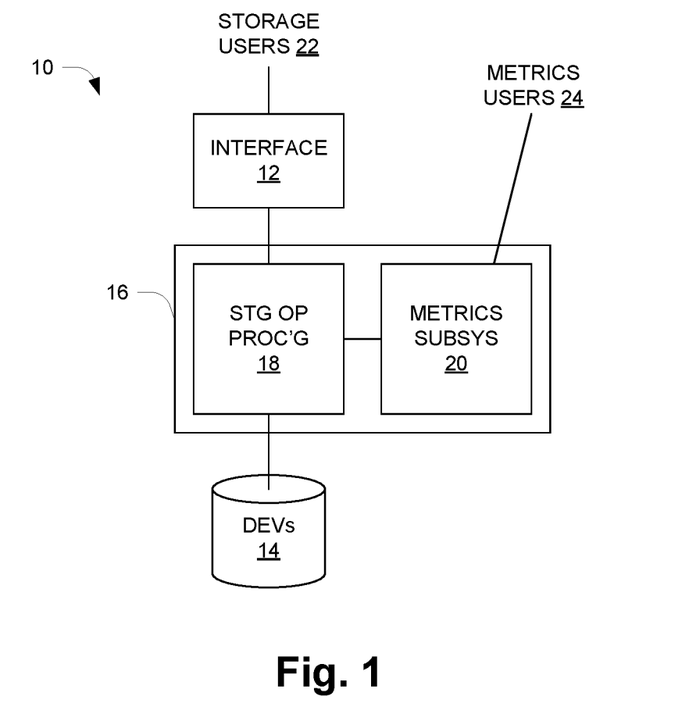
FIG. 1 is a block diagram of a data storage system.

FIG. 1 shows a data storage system 10 as including interface circuitry 12, storage devices (DEVs) 14, and processing circuitry 16, which is shown as including storage operations processing (STG OP PROC'G) 18 and a metrics subsystem 20. In operation as generally known, the data storage system 10 stores data of storage users 22 on the storage devices 14 and provides stored data to the users 22. These operations are referred to as storage operations (e.g., write and read operations), and they are executed by the storage operations processing circuitry 18. In addition, the metrics subsystem 20 collects and stores various operating metrics and capacities and makes the resulting stored metrics data available to metrics users 24, e.g., system administrators, etc. A "metric" is a monitored or measured value reflecting associated storage operations, such as a measure of data transfer rate, operation rate, etc., which typically fluctuates throughout operation and is thus monitored continually, typically at some interval (e.g., 1-second interval). A "capacity" is a static or dynamic measure of resource availability or utilization, e.g., a configured size of a logical volume or other storage object. Illustrative examples are described below.

Figure 2:
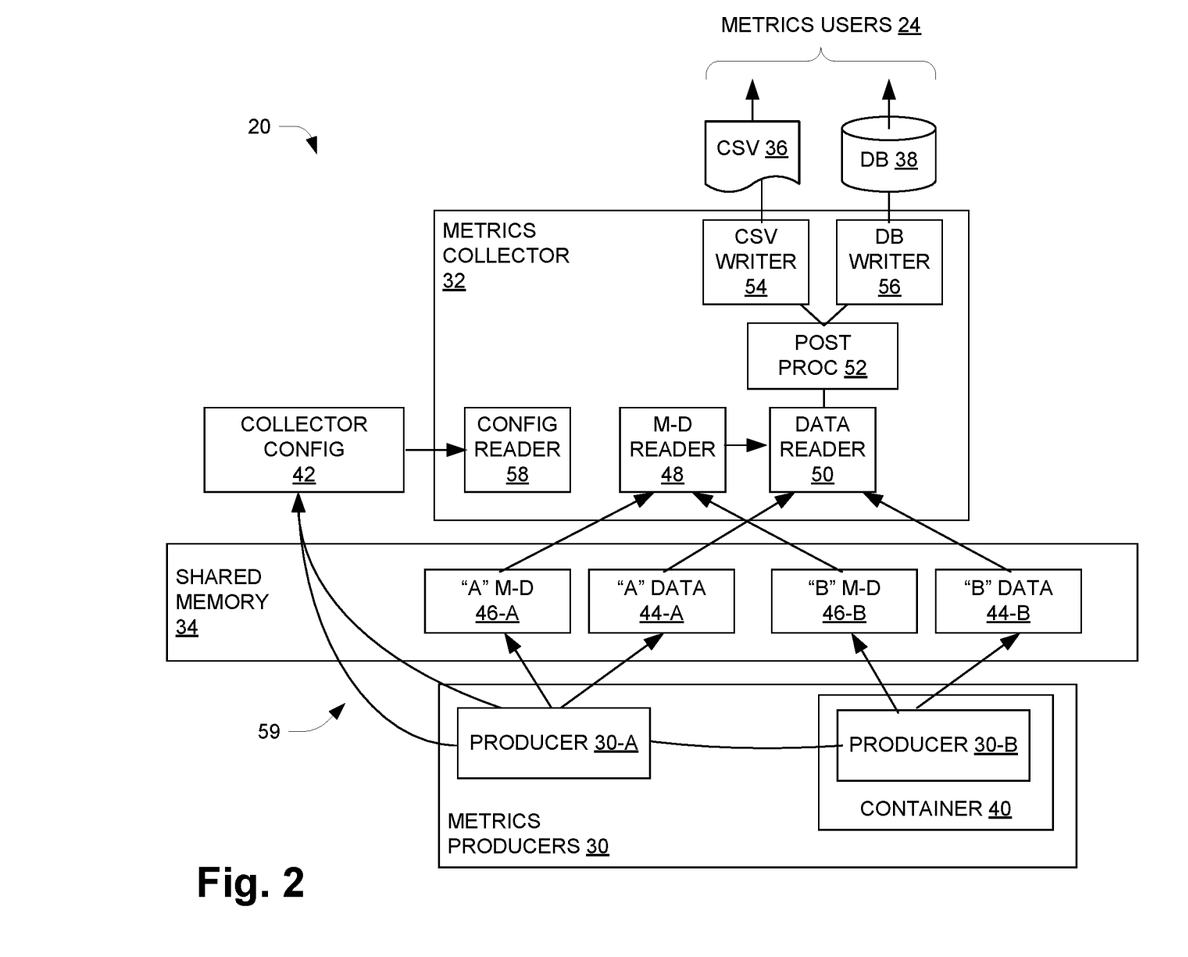
FIG. 2 is a schematic diagram of an arrangement of communicating metrics data from a producer to a collector using a self-describing shared memory.

FIG. 2 is a schematic diagram of the metrics system 20. At a high level, it includes metrics producers 30 (two producers 30-A, 30-B shown), metrics collectors 32 (one shown), and a shared memory 34 by which metric data produced by the producers 30 is communicated to the collectors 32. A metrics collector 32 may provide metrics data to the metrics users 24 in a variety of ways, including use of a file such as a comma-separated variable (CSV) file 36 or use of a database (DB) 38. In some embodiments it may be desired to deploy producers 30 and/or collectors 32 in respective containers such as docker containers, an example of which is shown as container 40 for producer 30-B. Also, the metrics subsystem 20 includes collector configuration data 42 used to communicate information about the producers 30 and their metrics data sets to a collector 32, as described more below.

The producers 30 communicate metrics data to a collector 32 using respective data sets in the shared memory 34, each of which has a "data" region for the metrics data and a "metadata" (M-D) region for metadata that describes the structure of the data region. In the example of FIG. 2, producer 30-A is shown as using an "A" data region 44-A and an "A" metadata region 46-A, and the producer 30-B is shown as using a "B" data region 44-B and a "B" metadata region 46-B. The collector 32 includes a metadata reader 48 and a data reader 50, along with post processing 52 and one or more writers for providing the output metrics data in a required format, e.g., a CSV writer 54 and a DB writer 56 as shown. The collector 32 is also shown as including a configuration reader 58 for reading the collector configuration data 42. As indicated at 59, the producers 30 register themselves by storing registration data in the collector configuration 42, enabling the collectors 32 to identify new producers 30 and begin collecting their respective metrics data in subsequent operation.

It will be appreciated that in general a system will include multiple producers 30 and collectors 32 for respective distinct metrics data, and that the structuring and functionality described herein generally applies to producer-collector pairs (or sets) and respective sets of metrics data, each having a respective data and metadata component. The distinct sets of metrics data will relate to respective distinct objects or components of interest in the system 10. As an example, while one set of metrics data may be Volume Space metrics such as in an example given below, the system may also produce and collect myriad other types of metrics data, each generally requiring a different producer/collector pair or set. For example, another type of metrics data may be performance data such as input/operations per second for different components within the system, and this data may be gathered using a respective distinct producer/collector pair or set (separate from the producer/collector for Volume Space Metrics, for example).

Figure 3:
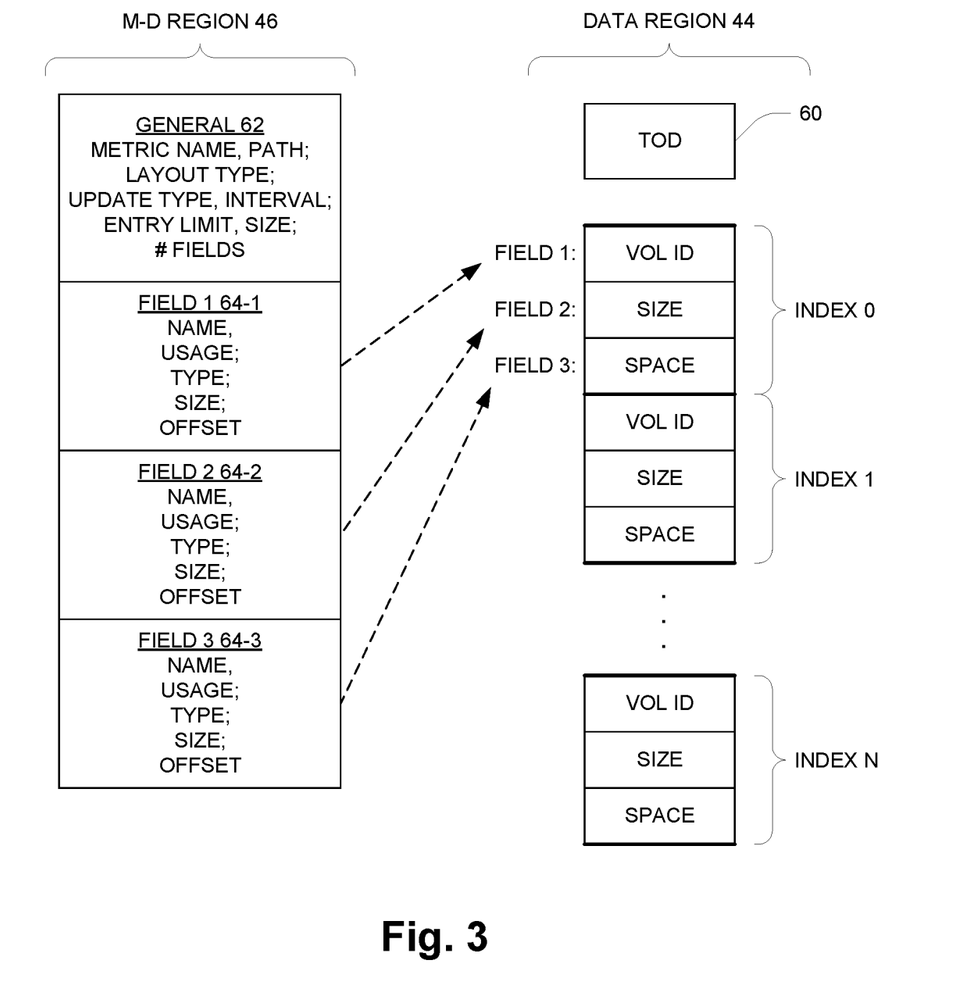
FIG. 3 is a schematic diagram of structure and content of a self-describing shared memory according to a first embodiment.

FIG. 3 is a schematic depiction of a data region 44 and metadata region 46 for an example metric, "Volume Space Metrics". The arrangement of FIG. 3 is also an example of one type of structuring or layout of these regions, which is referred to as "Array" layout type. An alternative "Map" layout type is described below.

The data region 44 is shown as storing a time-of-day (TOD) variable 60 as well as a plurality of records for respective distinct storage volumes of the DSS 10. The records are indicated in FIG. 3 by respective indicators Index 0, Index 1, etc. which indicate the relative locations of the records in the data region 44. In this example, each record has three fields of different types shown as Field 1, Field 2, and Field 3. These are a Volume Identifier (VOL ID, a string), Committed Size (SIZE, an integer representing size in known units, e.g., MBs), and Logical Space (SPACE, an integer of similar type as SIZE) respectively. In typical use, a Volume ID will follow some system-defined scheme by which storage volumes are named. As a simple example, a system may simply assign monotonically increasing volume numbers as new volumes are created, in which case a Volume ID is a number of some known size and format. Other volume naming schemes are of course possible.

The metadata region 46 is shown as having a General area 62 and a succession of Field definition areas 64, which in this example are three in number (64-1, 64-2 and 64-3). The General 62 area includes several data items describing the metric data collection generally, including the number of fields that are contained in each record. Additional detailed description is given below. Each Field area 64 describes the structure of a corresponding field of a record. For this example having three fields for each record, there are three Field definition areas 64, each corresponding to a respective field type as indicated by the dotted arrows. The Field 1 definition 64-1 describes the structure of the first field (Field 1), which in this example is the Volume ID. The Field 2 definition 64-2 describes the structure of the second field (Field 2), which in this example is Committed Size. The Field 3 definition 64-3 describes the structure of the third field (Field 3), which in this example is Logical Space. It will be understood that each record contains the same three fields Field 1, Field 2 and Field 3 having the same defined structure. In the illustrated embodiment, each Field definition 64 includes five values, which in this example are Name, Usage, Type, Size and Offset for the respective field. These are described in more detail below. Overall, the Field definitions 64 collectively describe the structure of each record of the data region 44.

Table 1 below describes structure and content of the General area 62 for a given metric, such as the example Volume Space Metrics given above.

TABLE 1

Per-Metric General Metadata 62

| Segment Name | Type | Description |
| --- | --- | --- |
| metric_name | String | An identifying name of the metric/capacity, e.g., "Volume Space Metrics" |
| metric_path ("Path") | String | The path or location of the data region for this metric, to enable a collector 32 to locate and load the metric data |
| layout_type | Enum | Type indicator for layout of data region, e.g., "1" for Array-based and "2" for Map-based |

TABLE 1-continued

Per-Metric General Metadata 62

| Segment Name | Type | Description |
|---|---|---|
| update_type | Enum | Indicator for manner by which the producer 30 updates the metric data, i.e., at a fixed interval or dynamically at any time. Use of this value helps ensure data consistency between producer and collector without dependency or synchronization |
| update_interval ("Interval") | Integer | Update interval (e.g., in seconds) for metric using fixed-interval update. The producer updates the data at least once within the interval |
| entry_limit | Integer | The maximum record count of the metric |
| entry_size ("Size") | Integer | The total memory size of one record of the metric |
| #_fields | Integer | The number of fields in each record of the metric |

It will be appreciated that the general metadata 62 is used by a collector 32 to control some aspects of its accessing of the metrics data. A collector 62 uses the layout_type to understand high-level structure of the data region 44, i.e., whether the records are arranged in a single area without any internal indirection or in multiple areas with indirection, such as described below for an alternative Map-based structure. Update_type and update_interval are used to control the nature of timing of collector interrogating of metrics data as it is regularly updated during a period of operation. For example, for data subject to periodic updating, the collector 62 uses the update_interval to set its own timer for how often to perform a collection cycle. Entry_size and #_fields are used to control exactly how a collector 32 locates and parses the data as distributed in the various fields of each record, i.e., to locate the start and extent of the data of each field, and to segregate and identify collected data accordingly.

Table 2 below describes structure and content of each Field definition area 64 for the metric:

TABLE 2

Per-Field Metadata 64

| Segment Name | Type | Description |
|---|---|---|
| field_name ("Name") | String | The name of the field. In this example, these are Volume ID (VOL ID), Committed Size (SIZE) and Logical Space (SPACE) for the three fields Field 1, Field 2, and Field 3 respectively |
| field_usage ("Usage") | Enum | Flag indicating whether the field is a key or a counter. In this example, Field 1 (Volume ID) is a Key, and the other two fields are Counters |
| field_data_type ("Type") | Enum | The data type of the field, such as u64, into which the memory segment is expected to be translated. In this example, Field 1 is a string, and Fields 2 and 3 are u64 integers |
| field_size ("Size") | Integer | The memory size (e.g., in bytes) of the field |
| field_offset ("Offset") | Integer | The offset (e.g., in bytes) to the beginning of the field in each record |

As with the general metadata 62, it will be appreciated that the per-field metadata 64 is used by a collector 32 to control other aspects of its accessing of the metrics data, such as how to interpret the data (according to field_type), and the size and relative location of the field data in the record (field_size, field_offset).

Figure 4:
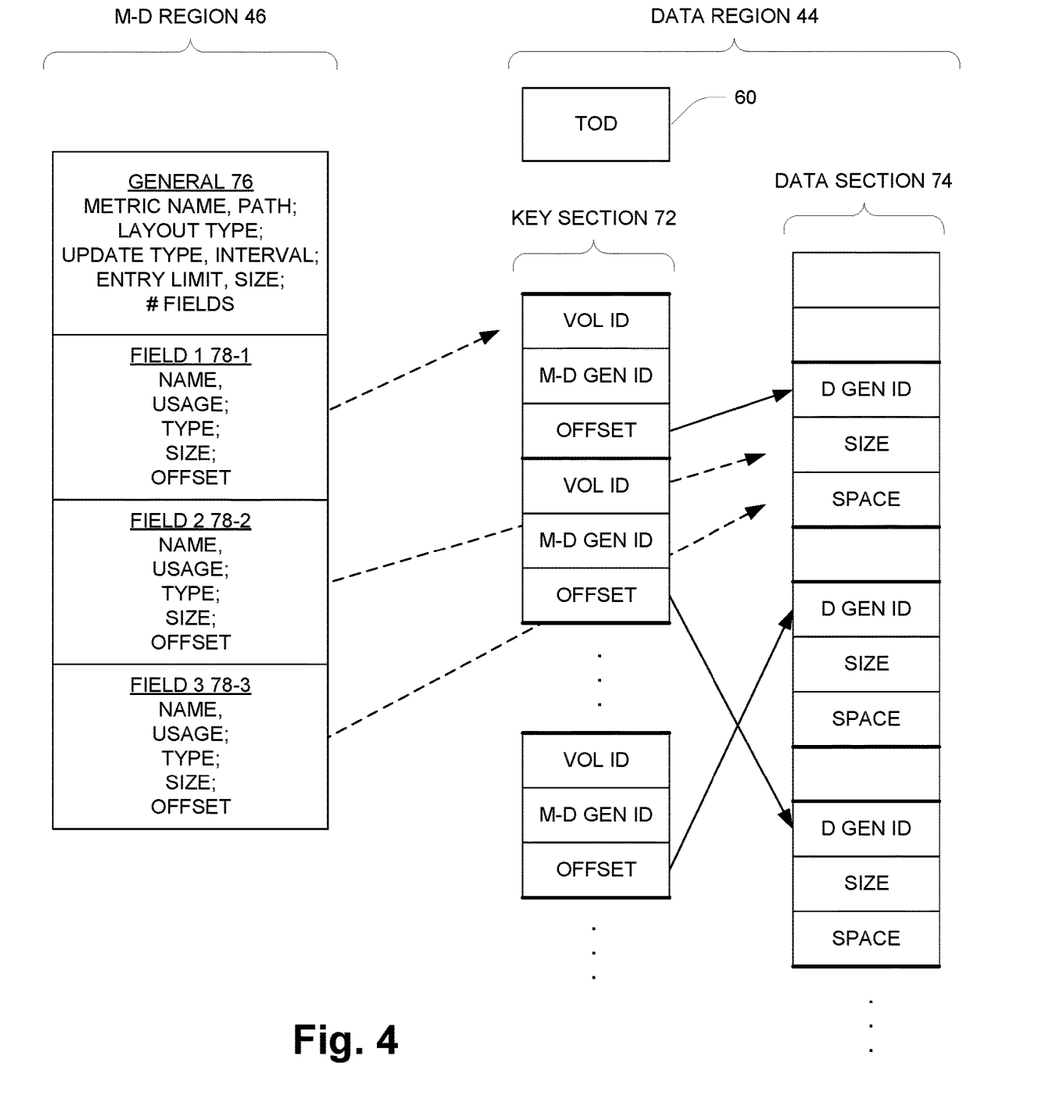
FIG. 4 is a schematic diagram of structure and content of a self-describing shared memory according to a second embodiment.

FIG. 4 is a schematic depiction of the data region 44 and metadata region 46 for the same example metric, e.g., "Volume Space Metrics", according to the alternative Map-type layout as mentioned above.

The data region 44 is shown as storing the time-of-day (TOD) variable 60 as well as a plurality of records for respective distinct storage volumes of the system. The data region 44 is structured to include a key section 72 and a data section 74 to contain the records. In this example, each record again has the three fields Volume Identifier (VOL ID), Committed Size (SIZE), and Logical Space (SPACE) respectively. The Volume Identifier (Field 1) is stored in the key section 72 along with a metadata generation identifier (M-D GEN ID) and an offset (OFFSET) pointing to the remaining fields in the data section 74. For each record, the data section 74 includes a data generation identifier (D GEN ID) along with the Size and Space fields (Field 2 and Field 3 respectively).

The metadata region 46 is shown as having a General area 76 and a succession of Field definition areas 78. These are generally the same as the corresponding fields 62, 64 of the Array layout of FIG. 3 as described above, with the respective offsets being interpreted as pointing to either the key section 72 or data section 74 as indicated by the dashed arrows.

The following describes a Producer/Collector access protocol using the shared memory 34 structured in the map-based manner of FIG. 4. The following description uses the terms "counter", "entry", and "tuple" to describe what has also been referred to as a "record", i.e., the data content in the data region 44 for a specific metric (e.g., volume space metric).

Producer 30:
1. When initially creating a new record, the producer 30 generates a uint64 data generation id and writes it into the record, initializes other record/counter fields, initializes the corresponding metadata, and sets the metadata generation id to equal the generation id.
2. When removing a record, the producer 30 changes the data generation id to invalid (e.g., 0), then changes the metadata generation id to invalid (e.g., 0).
3. When reusing a record, the producer 30 generates a new generation id and writes it into the record, initializes other record/counter fields, initializes the corresponding metadata, and sets the metadata generation id to equal the generation id.

Collector 32:
1. The collector copies the entire metrics data collection in the shared memory 34 into its own internal memory at a given single TOD
2. Scan ID array tuples one by one. For each tuple,
   a. If metadata generation id is invalid (0), the tuple is skipped
   b. If metadata generation id and data generation id aren't equal, the tuple is skipped
   c. If metadata generation id and data generation id are equal, process the object data pointed by the tuple offset field.

Below is a simplified example for a set of three distinct volumes:
1. Volume with id "11111111" is valid, metadata generation id and data generation id are equal, the collector will process this volume counter from copy.
2. Volume with id "22222222" is being removed, its data generation id has been set to 0 (invalid) at the beginning. But its meta generation id still has a valid value (of 200, for example), i.e., it has not been cleared. An inconsistency is detected, and the collector won't process this volume counter.

3. Volume with id "33333333" is being allocated, its data generation id (e.g., 300) has been allocated, its counter fields have been initialized to 0, its metadata (ID, offset) has been established but its generation id in metadata has not yet been updated. So, the metadata generation is invalid, and the collector won't process this volume counter.

Data Consistency

The metrics data in the shared memory 34 is created and updated by the producer 30. The collector 32 is reading the memory according to a collection interval defined in the metadata region 46. To decouple the collector 32 and the producer 30, conventional mechanisms of synchronizing memory reads and writes (e.g., semaphores) are avoided. To make sure the collector 32 reads the correct data, the system uses the additional memory segment time_of_day (TOD) 60, which is the timestamp in seconds, at the beginning of the data region 44.

Then for a metrics type that is updated at a fixed interval, the TOD 60 is first loaded and checked. If the target collection timestamp equals the TOD 60 in the shared memory, the metrics data is properly updated and valid, and should be collected. Otherwise, the metrics data is stale and invalid, and shouldn't be collected.

For a metrics type that is updated dynamically at any time, TOD 60 is also checked. However, the producer 30 could change the metrics data quite frequently, and it may be inefficient to update the timestamp each time when the producer updates the metrics data. Hence the collector 32 would load the metrics data unless the TOD 60 is older than the target collection timestamp by more than some predefined value (e.g., 10 seconds).

Figure 5:
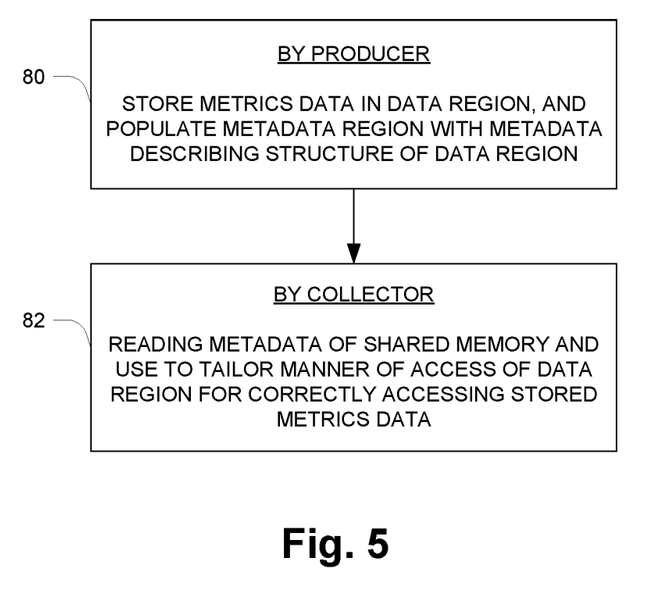
FIG. 5 is a high-level general flow diagram of a method of using a self-describing shared memory.

FIG. 5 is a general, high-level flow diagram of basic operation for obtaining metrics data describing performance and capacities of a system and provide the metrics data to external metrics users.

At 80, by a metrics data producer, metrics data is stored in a data region of a shared memory (e.g., 34), and a metadata region of the shared memory is populated with metadata describing a structure of the data region. Referring to the example of FIG. 3, the producer 30 populates the 3-field records of the respective storage volumes at their respective indexes (0, 1, . . . , N) in the data region, and populates the general are 62 and field areas 64 with information describing the metric generally (e.g., name, type, interval, etc.) and the 3-field structure and content of the stored metrics data).

At 82, by a metrics data collector, the metadata of the shared memory is read and used to tailor a manner of access of the data region by the metrics data collector for correctly accessing the stored metrics data. Referring to the example of FIG. 4, the collector 32 examines the metadata of the metadata region 46 to obtain the description of the metric and the structuring of the metric data stored in the data region 44, i.e., the presence of exactly 3 fields and their content and relative memory locations per the field definitions 64. This information enables the collector 32 to coherently extract all the individual records and to examine their contents per the field definitions 64. The collector 32 can then provide the metrics data to separate users, such as described above with reference to FIG. 2 for example.

Figure 6:
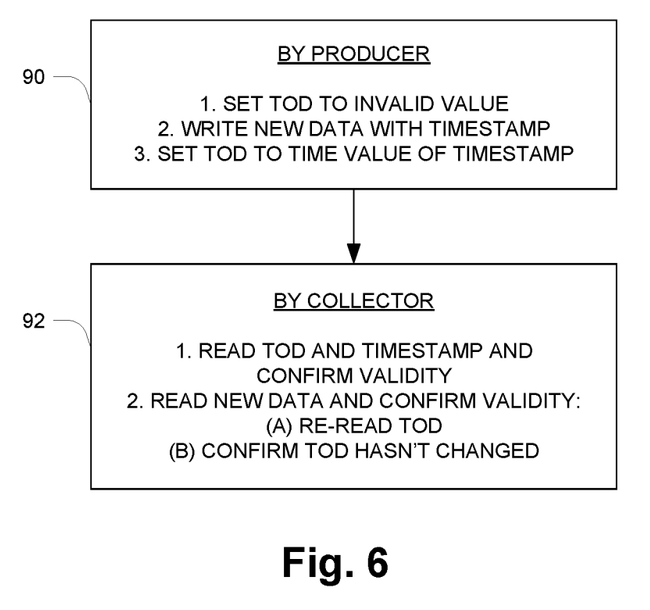
FIG. 6 is a high-level general flow diagram of a method of ensuring consistency of data communicated from a producer to a collector.

FIG. 6 is a general, high-level flow diagram of a method of ensuring consistency of data being received by a producer from a collector via a shared memory at regular intervals. The method assumes use of a time-of-day (TOD) variable for storing a time value with a granularity at least as fine as an interval size of the intervals.

At 90, by the producer for new data to be written into the shared memory for a given interval, (1) the TOD variable is first set to an invalid value, (2) next the new data is written into the shared memory with a timestamp, and (3) next the TOD variable is set to a time value corresponding to the timestamp.

At 92, by the collector for the new data, (1) the TOD variable and timestamp are read from the shared memory and it is confirmed that the TOD variable has a valid time value and is equal to the timestamp. Assuming so, then (2) the new data is read from the shared memory, and the validity of the new data is confirmed by (a) reading the TOD variable again from the shared memory, and (b) confirming that the TOD variable has the same valid time value as in the reading step (1). Assuming this confirmation is successful, the new data is processed as new metrics data to be provided to separate users, such as described above with reference to FIG. 2 for example. If either confirmation step (1) or (2) fails, this signifies that the stored data is either stale or otherwise not usable, and thus the data is not processed as new metrics data for this interval or sampling instance.

Summary of Features

1. Decoupling

The self-descriptive memory layout makes it possible for a producer to add or update metrics counters independently, decoupling from a collector. This is a key value compared with existing solutions, where changes in producers generally require changes in the collector. This feature can be useful for example in a development setting, enabling a development team to quickly add new metrics support.

2. Language-Neutral

The producer and collector can be developed in different preferred languages. For example, a low-level producer could be creating shared memory regions in C, while a higher-level producer could use Java or Python to create shared memory regions. The collector could also be variably implemented. This feature can be advantageous for example in larger-scale development efforts, where different components are owned by different teams with different skillsets.

3. Scalable

The shared memory could be read simultaneously by different collectors without allocating additional system resources for each collector. This flexibility can be provided without the typical costs of Remote Procedure Call (RPC), for example, in which more collectors introduce more socket connections to the producers. This feature may be especially useful for embedded systems, where system resources are highly constrained.

4. Efficient

For each collection time, the metrics data may be copied only once and directly from the producers' memory.

5. Easily Integrated

The technique may require no additional third-party libraries. The producers only need to organize the metrics data in the required memory layout and update them regularly.

While various embodiments of the invention have been particularly shown and described, it will be understood by those skilled in the art that various changes in form and details may be made therein without departing from the scope of the invention as defined by the appended claims.

What is claimed is:

1. A method performed for data being transferred by a producer to a collector via a shared memory at regular intervals, comprising:

maintaining a time-of-day (TOD) variable for storing a time value with a granularity at least as fine as an interval size of the intervals;

by the producer for new data to be written into the shared memory for a given interval, (1) writing the new data into the shared memory with a timestamp for the given interval, and (2) setting the TOD variable to a time value equal to the timestamp; and by the collector for the new data, (1) reading the TOD variable and timestamp from the shared memory and comparing the TOD variable with the timestamp, (2) in response to the TOD variable being equal to the timestamp, then reading the new data as collected new data from the shared memory, and (3) in response to the TOD variable not being equal to the timestamp, then refraining from reading the new data as collected new data from the shared memory.

2. The method of claim 1, wherein the new data is first data updated at the regular intervals, and wherein the method further includes, for second data updated by the producer at other than regular intervals:

by the collector for the second data, (1) reading the TOD variable and the timestamp from the shared memory, and checking whether the TOD variable has a time value not older than the timestamp by more than a predefined maximum value, (2) in response to the time value being not older than the timestamp by more than the predefined maximum value, then reading the second data as collected new second data from the shared memory, and (3) in response to the time value being older than the timestamp by more than the predefined maximum value, then refraining from reading the second data as collected new second data from the shared memory.

3. The method of claim 1, wherein the TOD variable is stored in a data region of the shared memory that also stores the new data being written by the producer and read by the collector, and wherein the shared memory also contains a metadata region in which the producer stores metadata describing structure of the data region, the metadata being read and used by the collector for correctly accessing the new data.

4. The method of claim 3, wherein the metadata includes an update type and an update interval, the update type indicating that the new data is updated at the regular intervals, the update interval identifying the interval size of the regular intervals, the update type and update interval being used by the collector to control timing of accessing the new data to obtain the new data as the new data is updated by the producer.

5. The method of claim 4, wherein the update type and update interval are included in a general area of the metadata, and the metadata further includes a plurality of field definition areas each storing a respective field definition describing structure and content of a respective field of each of a plurality of records of the new data, each field definition being used by the collector to locate and interpret a respective field in each of the records of the new data.

6. The method of claim 5, wherein the field definitions each include at least a field name, field location, and field size for the respective field, the field name identifying contents of the field, the field location identifying a relative location of the field in each of the records, the field size identifying a size of the field.

7. The method of claim 5, wherein the general area further stores a layout type identifying a high-level structure of the data region, the layout type being selected from an array type and a map type, the array type having the records arranged in a single area with no internal indirection, the map type having the records arranged across multiple areas with at least one indirection from one area to another.

8. The method of claim 3, wherein the new data is contained in one record of a multi-record data collection being received by the producer from the collector via the shared memory, each record including a respective data generation identifier stored in the data region and a respective metadata generation identifier stored in the metadata region, and wherein the producer and collector operate according to a protocol including:

by the producer:
when initially creating a new record in the data region and when reusing a record of the data region, (i) generating a new data generation identifier and writing the new data generation identifier into the record, (ii) initializing other record fields, (iii) initializing corresponding metadata in the metadata region, and (iv) setting a metadata generation identifier to equal the data generation identifier; and when removing a record from the data region, changing the data generation identifier to an invalid value, and changing the metadata generation identifier to the invalid value; and by the collector, for collecting the new data:
copying the entirety of the data collection from the shared memory to private memory of the collector; and scanning and processing the records of the data by, for each record:
(i) skipping further processing of a record when the metadata generation identifier is invalid and when the metadata generation identifier is not equal to the data generation identifier; and
(ii) collecting record data for use when the metadata generation identifier is valid and equal to the data generation identifier.

9. The method of claim 8, wherein the collector makes the record data available for use by data users by storing the record data into one of a file and a database.

10. The method of claim 1, wherein the producer registers with the collector by storing registration data in a collector configuration readable by the collector to identify the producer and begin collecting the data in subsequent operation.

11. A data storage system, comprising:
interface circuitry configured to receive storage commands from remote storage users;
storage devices configured to store user data; and
processing circuitry configured to execute data storage operations using the storage devices in response to the storage commands, the processing circuitry including a subsystem configured to operate, for data being transferred by a producer to a collector via a shared memory at regular intervals, to:
maintain a time-of-day (TOD) variable for storing a time value with a granularity at least as fine as an interval size of the intervals;
by the producer for new data to be written into the shared memory for a given interval, (1) write the new data into the shared memory with a timestamp for the given interval, and (2) set the TOD variable to a time value corresponding to the timestamp; and
by the collector for the new data, (1) read the TOD variable and timestamp from the shared memory and compare the TOD variable with the timestamp, (2) in response to the TOD variable being equal to the timestamp, read the new data as collected new data from the shared memory, and (3) in response to the TOD variable not being equal to the timestamp, then refrain from reading the new data as collected new data from the shared memory.

12. The data storage system of claim 11, wherein the new data is first data updated at the regular intervals, and wherein the subsystem is further configured, for second data updated by the producer at other than regular intervals, to:
by the collector for the second data, (1) read the TOD variable and the timestamp from the shared memory, and check whether the TOD variable has a time value not older than the timestamp by more than a predefined maximum value, (2) in response to the time value being not older than the timestamp by more than the predefined maximum value, then reading the second data as collected new second data from the shared memory, and (3) in response to the time value being older than the timestamp by more than the predefined maximum value, then refraining from reading the second data as collected new second data from the shared memory.

13. The data storage system of claim 11, wherein the TOD variable is stored in a data region of the shared memory that also stores the new data being written by the producer and read by the collector, and wherein the shared memory also contains a metadata region in which the producer stores metadata describing structure of the data region, the metadata being read and used by the collector for correctly accessing the new data.

14. The data storage system of claim 13, wherein the metadata includes an update type and an update interval, the update type indicating that the new data is updated at the regular intervals, the update interval identifying the interval size of the regular intervals, the update type and update interval being used by the collector to control timing of accessing the new data to obtain the new data as the new data is updated by the producer.

15. The data storage system of claim 14, wherein the update type and update interval are included in a general area of the metadata, and the metadata further includes a plurality of field definition areas each storing a respective field definition describing structure and content of a respective field of each of a plurality of records of the new data, each field definition being used by the collector to locate and interpret a respective field in each of the records of the new data.

16. The data storage system of claim 15, wherein the field definitions each include at least a field name, field location, and field size for the respective field, the field name identifying contents of the field, the field location identifying a relative location of the field in each of the records, the field size identifying a size of the field.

17. The data storage system of claim 15, wherein the general area further stores a layout type identifying a high-level structure of the data region, the layout type being selected from an array type and a map type, the array type having the records arranged in a single area with no internal indirection, the map type having the records arranged across multiple areas with at least one indirection from one area to another.

18. The data storage system of claim 13, wherein the new data is contained in one record of a multi-record data collection being received by the producer from the collector via the shared memory, each record including a respective data generation identifier stored in the data region and a respective metadata generation identifier stored in the metadata region, and wherein the producer and collector are configured to operate according to a protocol including:
by the producer:
when initially creating a new record in the data region and when reusing a record of the data region, (i) generating a new data generation identifier and writing the new generation identifier into the record, (ii) initializing other record fields, (iii) initializing corresponding metadata in the metadata region, and (iv) setting a metadata generation identifier to equal the data generation identifier; and
when removing a record from the data region, changing the data generation identifier to zero, and changing the metadata generation identifier to zero; and
by the collector, for collecting the new data:
copying the entirety of the data collection from the shared memory to private memory of the collector; and
scanning and processing the records of the data by, for each record:
(i) skipping further processing of a record when the metadata generation identifier is zero and when the metadata generation identifier is not equal to the data generation identifier; and
(ii) collecting record data for use when the metadata generation identifier is non-zero and equal to the data generation identifier.

19. The data storage system of claim 18, wherein the collector is configured to make the record data available for use by data users by storing the record data into one of a file and a database.

20. The data storage system of claim 11, wherein the producer is configured to register with the collector by storing registration data in a collector configuration readable by the collector to identify the producer and begin collecting the data in subsequent operation.

21. The data storage system of claim 11, wherein the subsystem is a metrics subsystem, the data is metrics data being transferred from the producer to the collector, and the shared memory is a memory of the processing circuitry separate from the storage devices used for storing user data, and wherein the producer is further configured and operative to produce the metrics data by collecting operating metrics which are monitored or measured values in the data storage system reflecting associated ones of the data storage operations, and the collector is further configured and operative, for the metrics data transferred from the producer via the shared memory, to make the metrics data available to external metrics data users.

* * * * *